United States Patent
Alfano

(10) Patent No.: US 9,545,863 B2
(45) Date of Patent: Jan. 17, 2017

(54) LEGROOM CAVITY IN VEHICLE BACKREST FOR REAR-FACED CHILD IN CARSEAT

(76) Inventor: Kenneth Alfano, Canton, MI (US)

(*) Notice: Subject to any disclaimer, the term of this patent is extended or adjusted under 35 U.S.C. 154(b) by 899 days.

(21) Appl. No.: 13/491,548

(22) Filed: Jun. 7, 2012

(65) Prior Publication Data

US 2013/0134754 A1 May 30, 2013

Related U.S. Application Data

(60) Provisional application No. 61/563,721, filed on Nov. 25, 2011.

(51) Int. Cl.
*A47C 3/00* (2006.01)
*B60N 2/64* (2006.01)
*B60N 3/06* (2006.01)
*B60N 2/28* (2006.01)

(52) U.S. Cl.
CPC ............ *B60N 2/643* (2013.01); *B60N 2/2863* (2013.01); *B60N 3/06* (2013.01)

(58) Field of Classification Search
USPC .............................. 297/283.3, 283.1, 228.13, 188.07,297/188.13, 188.19, 188.01, 188.04
See application file for complete search history.

(56) References Cited

U.S. PATENT DOCUMENTS

| | | | | |
|---|---|---|---|---|
| 5,540,479 A | * | 7/1996 | Thomas et al. | 297/113 |
| 5,690,384 A | * | 11/1997 | Rossi | 297/283.1 |
| 5,758,924 A | * | 6/1998 | Vishey | 297/284.4 |
| 5,820,214 A | * | 10/1998 | Bessette et al. | 297/228.13 |
| 5,860,699 A | * | 1/1999 | Weeks | 297/284.3 |
| 6,059,358 A | * | 5/2000 | Demick et al. | 297/188.04 |
| 6,082,815 A | * | 7/2000 | Xiromeritis et al. | 297/188.04 |
| 6,109,686 A | * | 8/2000 | Fox | 297/423.38 |
| 6,241,188 B1 | * | 6/2001 | Simpson et al. | 297/218.1 |
| 6,315,359 B1 | | 11/2001 | Wetter | |
| D478,456 S | * | 8/2003 | Yoon | D6/611 |
| 6,676,209 B1 | * | 1/2004 | Szabo et al. | 297/228.13 |
| 6,688,686 B1 | * | 2/2004 | McEvoy et al. | 297/284.4 |
| 6,702,375 B1 | * | 3/2004 | Laskowski et al. | 297/283.1 |
| 6,817,665 B2 | | 11/2004 | Pacella et al. | |
| 7,210,738 B1 | * | 5/2007 | Mahaffy | 297/184.1 |
| D546,108 S | * | 7/2007 | Heiman-Philpott | D6/611 |
| 7,261,375 B2 | * | 8/2007 | Godshaw et al. | 297/228.12 |
| D562,612 S | * | 2/2008 | Simpson et al. | D6/611 |
| 7,341,297 B2 | * | 3/2008 | Nakamura et al. | 297/188.14 |
| 7,360,833 B2 | * | 4/2008 | Vitito | 297/217.3 |
| 7,458,635 B2 | | 12/2008 | Mendis et al. | |
| 7,472,955 B2 | | 1/2009 | Crane et al. | |
| 7,611,183 B2 | * | 11/2009 | Burkey et al. | 297/188.07 |
| 7,677,668 B2 | * | 3/2010 | Olsen et al. | 297/378.14 |
| 7,841,663 B2 | * | 11/2010 | Nathan | 297/284.7 |
| 7,845,724 B2 | | 12/2010 | Scheinberg | |
| 7,871,124 B1 | | 1/2011 | Hinds | |
| 8,141,948 B2 | * | 3/2012 | Cassellia et al. | 297/217.3 |

(Continued)

*Primary Examiner* — Jose V Chen

(57) ABSTRACT

A vehicle seat feature to provide additional legroom for feet or legs of a rear-facing child in a safety carseat installed in a vehicle seat, by utilizing a bounded cavity or the like in the vehicle seat backrest, which is accessible from the front side of the backrest by feet or legs of a rear-facing child. Such a cavity may in some embodiments be deployable and made available by removing or repositioning a barrier object or the like, which when restored may in effect constitute part of an otherwise normally functional backrest.

15 Claims, 3 Drawing Sheets

(56) References Cited

U.S. PATENT DOCUMENTS

2007/0170758 A1    7/2007   Allen et al.
2008/0100109 A1    5/2008   Frank
2010/0282902 A1   11/2010   Rajasingham

* cited by examiner

LEGROOM CAVITY IN VEHICLE BACKREST FOR REAR-FACED CHILD IN CARSEAT

CROSS-REFERENCE

This US non-provisional utility application claims the priority benefit of U.S. provisional application No. 61/563,721, entitled "Legroom Cavity in Automobile Seat Backrest for Rear-Facing Child in Safety Seat," filed on 25 Nov. 2011, which is hereby incorporated by reference in its entirety.

FIELD

This disclosure relates to the field of vehicle seating. More particularly, this disclosure relates to automotive seating assemblies configured specifically to increase the legroom available to rear-facing children in safety carseats.

BACKGROUND

This section contains general relevant background content, which is not necessarily prior art.

The American Academy of Pediatrics recommends that children be seated rear-facing in their car-seats until age 2 or until exceeding the height or weight limits of the car-seat (some of which can accommodate high limits). Some US states are presently reflecting this policy in new legislation, although the predominant rule still currently remains age 1 or 20 lbs. While the optimal point to switch-over is of course debatable, many people advocate for staying rear-facing for as long as possible; as this view becomes more prevalent (and even compulsory, for better or worse), there is value in easing any burdens associated with parental compliance.

Rear-faced child seating often presents a problem of limited legroom, especially for many children of above-average height or growth rate. Certain rear-facing-capable car seats (not to be confused with the car's own seating) offer design features that can mitigate this problem (e.g. shell height, seat depth, recline, etc.), allowing higher height and weight limits. Vehicle-focused approaches involve modifications to the seat in which the safety seat resides—such as making the backrest foldable over flatly on top of the seat portion to enable then placing the carseat thereupon, or having the carseat sit further forward on the seat portion and then having it be supported with a stabilizing member extending down to the car's floor (not common in the US). Simply moving or removing a backrest, or any severable portion thereof, might also be an option—though this could be suboptimal in many cases.

Some existing approaches do have utility, yet there remains an unsolved need for new solutions—as others have failed to sufficiently facilitate extended rear-facing (ERF). Research shows that many parents (up to 70%, in one recent study) still continue to turn their children's carseats to be forward-facing long before the recommended time, and this can be attributed in significant part to inadequate legroom.

SUMMARY

This section briefly, and non-exhaustively, summarizes the subject matter of this disclosure.

This disclosure describes a vehicle seating feature that accommodates a need for additional legroom for legs and/or feet of many rear-facing babies and toddlers in safety carseats. This accommodation is essentially a defined cavity or opening in the front of the backrest (i.e., generally the approximately upright portion) of a car's seating (not to be confused with the child's "car seat"), in a manner adapted to provide a place to receive a rear-faced child's feet.

The cavity, opening, or the like can be accessed from the front surface of the backrest of a vehicle seat of a vehicle interior (typically automotive). It can be located in an area of the backrest approximately where feet of rear-facing children typically go. It need not occupy a large surface area relative to the overall size of the backrest. The depth or other dimensions might vary and/or be made variable, depending upon the location of the seat and the amount of additional space to be provided. The cavity can optionally be made accessible or inaccessible on-demand, such as via a barrier or plugging object which could also serve to effectively restore adequate seating functionality (e.g., lumbar support) for adult passengers.

LIST OF DRAWINGS

This section briefly identifies the accompanying drawings (figures) for this disclosure. All drawings are for illustrative and explanatory purposes only and not intended to limit the present invention to any example embodiments or aspects depicted.

DETAILED DESCRIPTION

Figure 1:
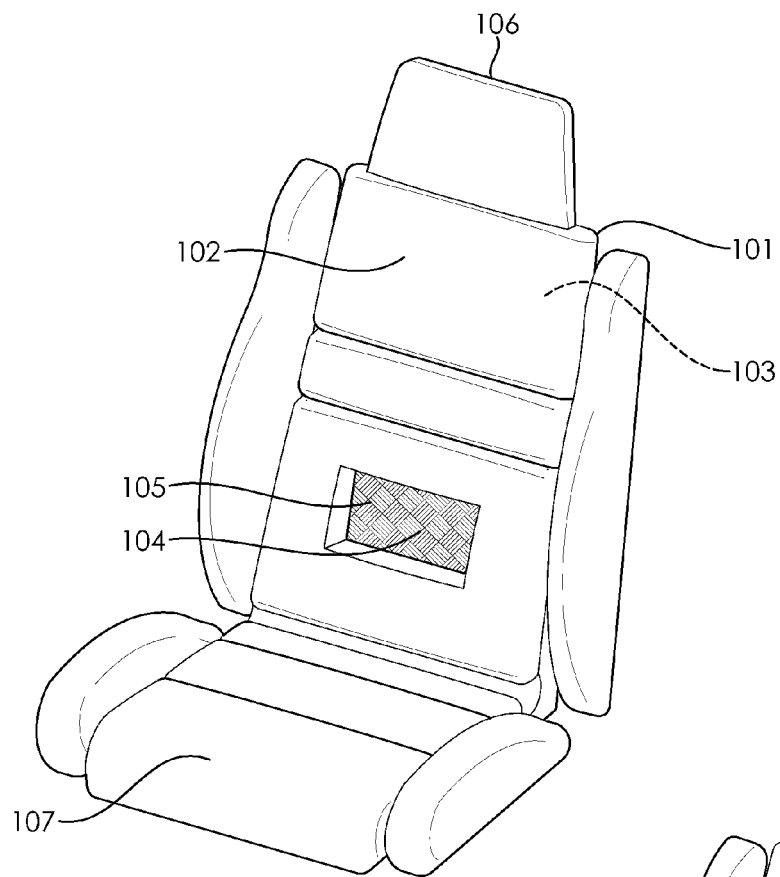
FIG. 1 depicts an example of an automobile seat having a backrest with a defined cavity suitable for holding feet or legs of a rear-facing child.

This section contains descriptive content for this disclosure, including for the associated drawings. It is also to be understood that much of the terminology and phraseology used herein is for the purpose of describing particular embodiments or aspects, and accordingly is not intended to be limiting.

This disclosure describes an auto seating feature that accommodates the need for additional legroom by many rear-facing babies and toddlers. This accommodation is essentially a predetermined cavity or opening in the front of the back or backing/backrest (upright) portion of automotive seating (not to be confused with a "car seat," also known more formally as a "child safety seat," which is a separately purchased object that is placed upon the normal seating—and in which the child sits). The cavity could also be made accessible or inaccessible on-demand, such as via a barrier or plugging object.

Many types of existing vehicle seating designs and materials are readily amenable to such adaptations, including both exterior materials and interior materials, neither of which need necessarily be of the same material as any removable portion made thereof. In some embodiments, it may be aesthetically desirable for at least the "exposed surface" of any barrier or plug to resemble or otherwise coordinate with that of the "main" backrest (e.g. sew lines, etc.). Of course, when the cavity is not deployed due to plugging, blocking, etc., an object/barrier may well be considered as essentially part of the backrest itself.

The cavity, opening, chamber, void, recess, cut-out section, or the like need not comprise a large surface area relative to the overall size of the seating back, thus not compromising its structural integrity (either when "opened" or "closed"). A single standardized footprint could accommodate a wide range of needs, even allowing for some variability in carseat heights, etc. The footprint should ideally be large enough to encompass where many or most carseats cause feet to touch the back. Alternatively, the footprint could be made adjustable. A variety of shapes are also possible (e.g., circle, rectangle, square, ellipse, among countless others) for the 2D surface geometry, as well for full 3D dimensions (e.g., a tapered or rounded indentation, etc.). The depth is also variable, depending upon the location of the seat (e.g. which row, if multiple rows of "back" seats, such as in a minivan or an SUV) and the amount of additional legroom/footroom being sought. In some embodiments, it may be functionally desirable for any barrier or plug to utilize a similarly-constituted bulking material as the "main" backrest, so as to facilitate structural restoration of comfortable usability for an adult passenger when the extra rear-facing child legroom is not needed.

One simple example embodiment may comprise simply a foam "cube" with an exterior surface functionally compatible with the main seating surface, being held in place either with just a snug fit or optional supplemental features such as Velcro™, snaps, hooks, latches, zippers, etc., and removable by the consumer—to be stored upon installing a carseat in the corresponding location. (Replacements for the removable component might be made separately available, in case of loss or damage.) Automobile seating models typically comprise thousands of pieces of attribute data, which would naturally need to be appropriately adapted to accommodate even a simple embodiment of a new cavity.

Removable portions of seat material may be designed to have boundaries or interfaces corresponding to seat surface design patterns. In some seat designs, it may be not be easy to conceal the existence of a "hidden" or closed cavity when not in use. And depending on how thick the cushion layer is for a given seat design, it may be best to design any non-cushion panels, structures, subsystems, etc. in a manner that avoids the designated cavity area so as to maximize dimensional options (to the extent feasible while maintaining sufficient structure and desired functionality), along with any appropriate adaptations to the frame or other components. Rear or middle (i.e., non-front-row) seats can be advantageous in this regard, as they may have more foam relative to other functional components; back seats can also have thicker/deeper foam to work with overall. In any event, the cavity itself requires appropriate technical adaptations pertaining to things such as sew lines, seam allowances, cover fit, and sewing instructions, as well as geometry of both cushion and skin material (all being customized to the particular desired design parameters). The quantity of cavities to be provided in a given car is also flexible: if desired, one could be incorporated into each vehicle seat that can accommodate a carseat (whether standard or as a customer option).

One option for an implementation employing a removable portion is to have it remain attached in some way, either to serve a secondary function or simply to prevent loss when the cavity is "open." It could be loosely connected just to prevent loss, repositionable is some fixed way, or even embedded so as to essentially still remain part of the backrest. For example, a currently preferred embodiment would be to have a removable portion which pulls out and flips up or down to be above or below the cavity area, affixing there via Velcro™ or invisible zipper (until the carseat gets uninstalled). Any mechanism for creating or opening the space on-demand should make provision for feasible and convenient repositioning of all necessary material.

Other embodiments may comprise collapsible or otherwise internally movable material that gets pushed inward, upward, sideward, etc. within the seat backing (the feasibility of which would depend upon the seating material and design). Depending upon how taught the skin material is (and/or how much slack is targetedly appropriated), together with whether external protrusion is involved (vs. wholly-internal adjustments), etc., the reconfiguring could be actuated by pushing on or sliding a reversibly-movable portion of the backrest's front surface. Variations on this approach could include having the size and/or shape of the hole be adjustable or otherwise customizable. In some versions, displaced material (rigid or soft) could extend to significantly behind the backrest, effectively extending the legroom being added to an extent greater than the thickness of the backrest itself (while maintaining the full cavity's envelopment with material, for some measure of separation or protection). In any event, there are notable benefits to maintaining some sort of definable limitation on the cavity, whether via material envelopment or otherwise, including child comfort and safety, plus preventing intrusion upon whatever area lies "behind" the particular vehicle seat; moreover, a full or partial rear and/or peripheral barrier to the cavity can give some protection against projectiles going through it (such as in the event of a collision). Such boundedness also tends to increase the proportion of a cavity enjoying a protective periphery around the sides.

An embodiment without a removable portion might simply comprise strategically placed partial holes in certain seat designs—configured to provide convenient placement of feet or legs for a child sitting rear-facing, but also appearing and serving otherwise as an acceptable default seat design. This may not be an optimal design, however, because desirable cavity depth for child-legroom purposes may be too much depth for an adult passenger sitting normally. (Note that fortuitous cavitation could potentially already happen today by happenstance, including via designs having removable/repositionable items built-in; such items could even themselves be integrated car-seats, although any such incidental cavitation is not configured for legroom purposes—and in any event is limited to such systems, which are not very common. Likewise, some armrests fold down and happen to leave a cavity between seats, yet these are neither located nor configured in a manner conducive to enhancing child legroom, and can be considered separate from the main backrest portion, as it is not normally where a back rests.) Another way to avoid employing a truly "removable" portion but nevertheless serve an equivalent role could involve a variation of the internal condensing/collapsing notion—such as having an air-filled obstruction occupy the cavity when not in use, being deflatable or relatable upon demand (perhaps automatically, if power is run to it).

Following next are descriptions and explanations of the example embodiments depicted in the accompanying drawings. In conjunction with the rest of this disclosure, these figures help to show a (non-exhaustive) range of alternative possibilities for implementing certain essential and non-essential features, aspects, etc.

FIG. 1 depicts an example of an automobile seat having a backrest 101 with a front surface 102 and a back surface 103. In the front surface is an opening to a cavity 104 suitable for holding feet or legs of a rear-facing child. The cavity depth does not extend completely to the backrest's back surface, and a lining at the "inner end" of the cavity 105 corresponds to the limit of the legroom it provides; hence overall, the seat backrest effectively encloses most of the cavity. Other components of this particular seat assembly include both a headrest 106 and a seat cushion 107.

Figure 2:
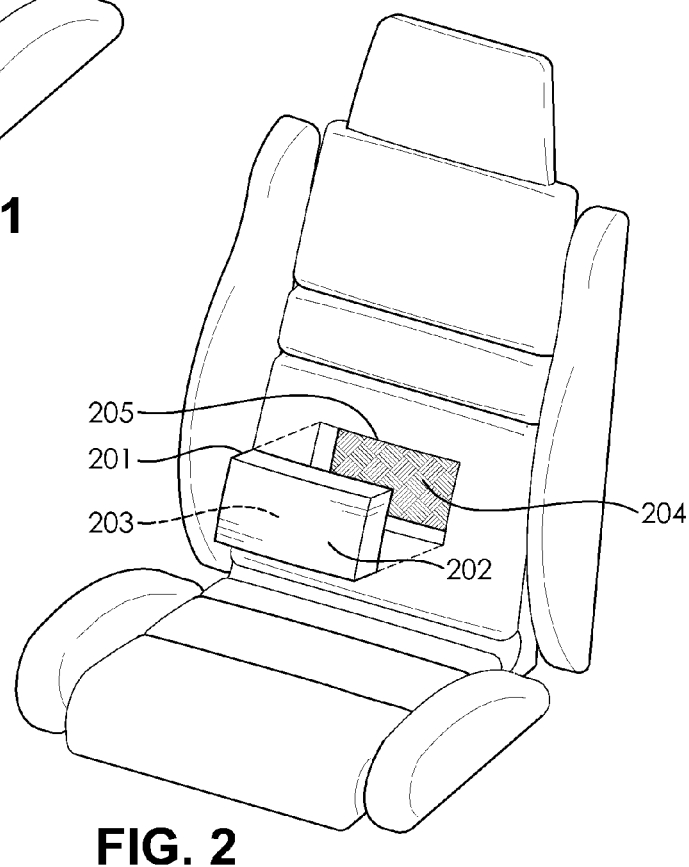
FIG. 2 depicts an example seat as in FIG. 1, with a removable object disposed to plug the cavity when use of it is not needed.

FIG. 2 depicts an example seat as in FIG. 1, with a removable object 201 disposed to plug the cavity when use of it is not needed, such that the removable object can constitute part of the backrest in a sufficiently integrated manner that could restore lumbar support for an adult passenger using the seat. The removable object has both front outer surface material 202 and internal cushion material 203 similar to the backrest. When this object is removed, it exposes the cavity 204 thereby rendering it available for use. And in this case, a standard invisible zipper along and around the cavity's front edge 205 holds the removable object in place in the cavity when the additional legroom is not needed or desired.

Figure 3:
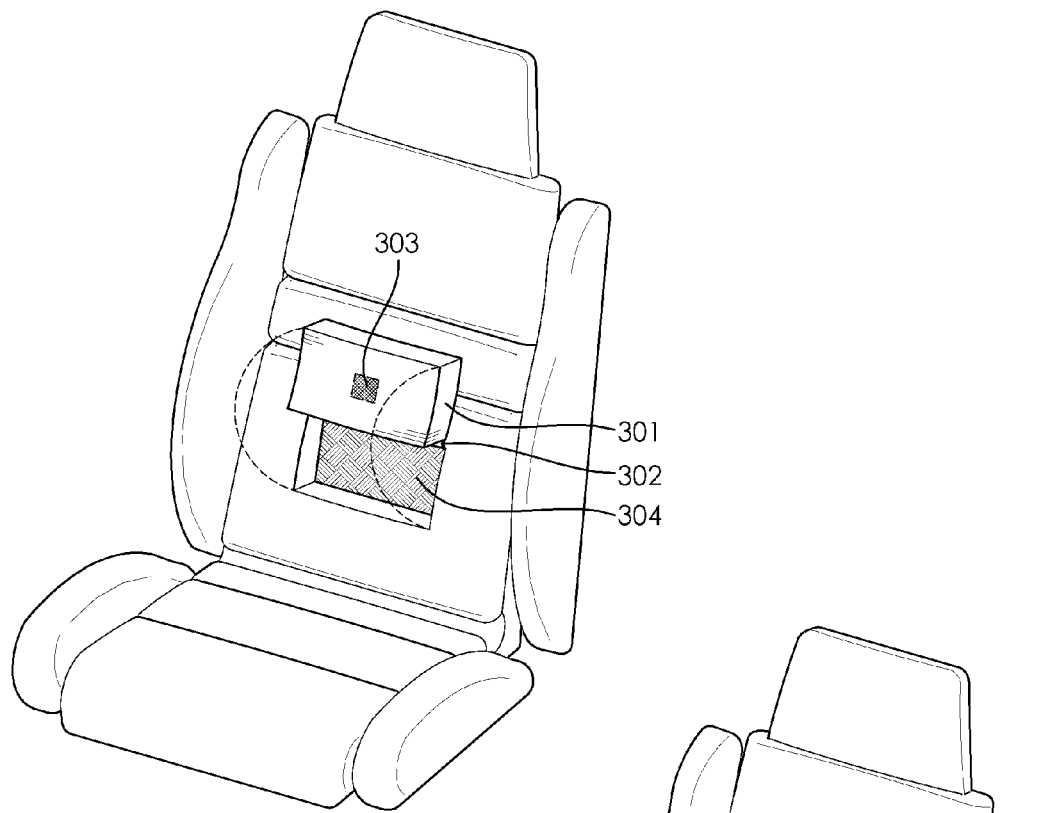
FIG. 3 depicts an example seat as in FIG. 1, with a removable object disposed to flip up upon being pulled out of the cavity, and affix to an area directly above the cavity.

FIG. 3 depicts an example seat as in FIG. 1, with a removable object 301 disposed to be outside the cavity but remain attached to the backrest via contiguous backrest skin material 302 connecting the removable (removed) object to inside of the cavity while the cavity is open for use. In this case, the removable object flips up upon being pulled out of the cavity, and is affixed to an area directly above the cavity on the front surface of the backrest by a hook-and-loop fastener patch (i.e., Velcro™) 303, thus keeping the object nearby while still maintaining a well-opened cavity 304.

Figure 4A:
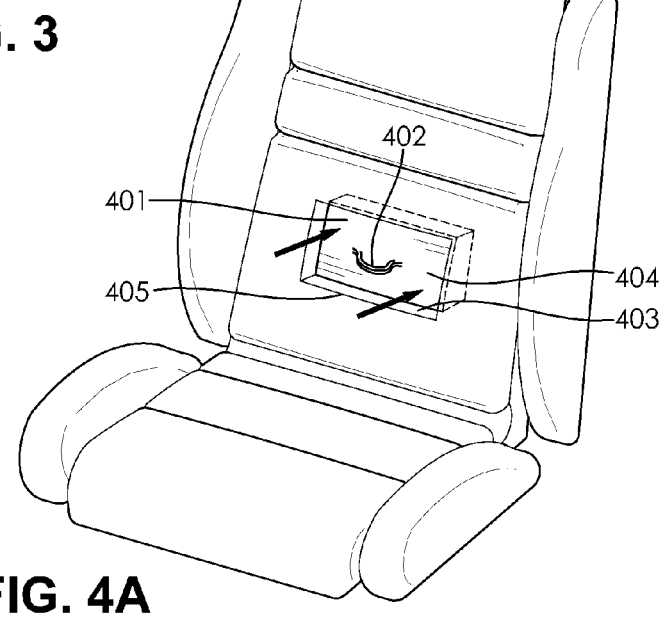
FIG. 4A depicts an example seat as in FIG. 1, with a displaceable object which has been pushed to slide inward into the backrest from its front side.
Figure 4B:
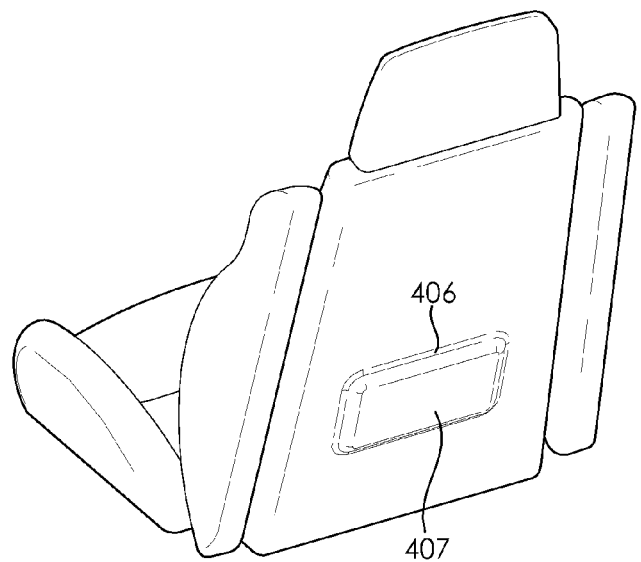
FIG. 4B depicts a rear view of this example, in which the rear side of the object is displaced outward when the front side of the object is pushed inward.

FIG. 4A depicts an example seat as in FIG. 1, with a displaceable object 401 having a small loop or handle 402 on its front to facilitate pulling when desired. The object gets pushed to slide "inward" into the backrest from its front side, exposing peripheral lining 403 around the cavity 404 being created. When the loop/handle is pulled, the cavity closes again and can be fixed in this position with an invisible zipper along its front perimeter 405. FIG. 4B depicts a rear view, including a back-side perimeter of the cavity 406 which in full extends through the full thickness of the backrest, but only the displaceable object or appropriately sewn excess skin material displaced thereby 407 actually ends up protruding out of the back of the main backrest, owing to either an internal catch curtailing the object's rearward slide (not shown) or a fixed amount of slack in optional excess skin or cover material.

Figure 5:
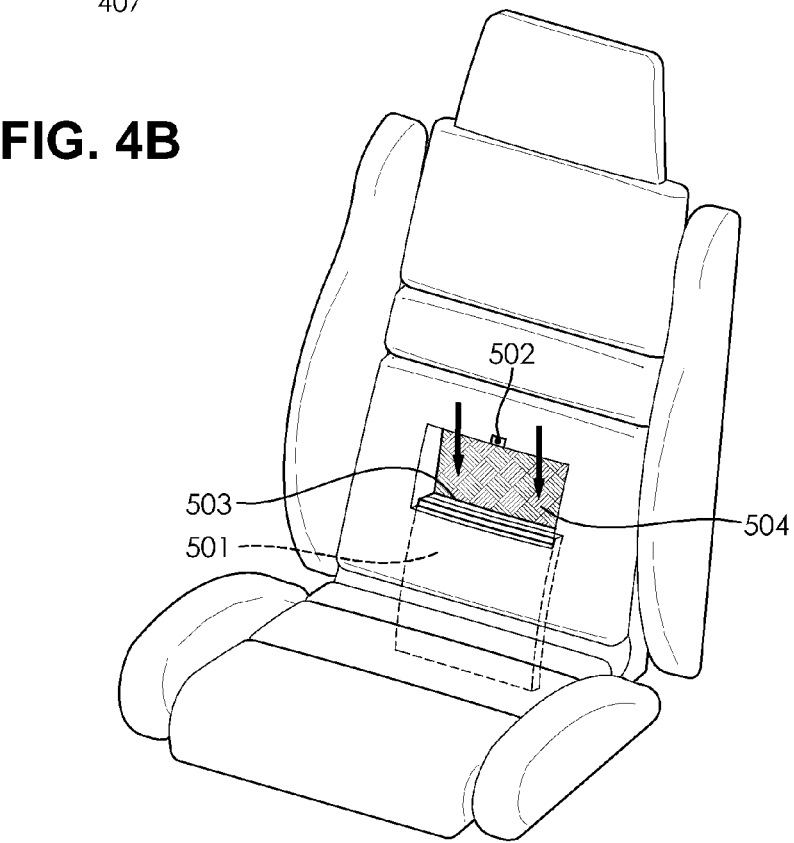
FIG. 5 depicts an example seat as in FIG. 1, plus a thin slidable barrier that slides down, displacing the bottom part of the barrier to protrude below the backrest.

FIG. 5 depicts an example seat as in FIG. 1, plus a thin slidable barrier 501 that slides down directly below the cavity near the front of the main backrest (causing protrusion below underneath the backrest when "open"). Where the top of the slidable barrier meets the top of the cavity resides a snap 502 which must be disengaged to permit the downward sliding of the slideable barrier and thus the opening of the cavity; a corresponding piece opposite the snap may reside upon the top part of the barrier. Optional incremental catches (not shown) could be also implemented to facilitate a partial or incomplete opening (e.g., to give a higher place to rest feet), and in any event could be employed to curtail the downward slide in order to keep the barrier object within its groove and/or to keep at least a small portion from falling too far to be able to grab it for closing.

With this general approach, most of the cavity remains unoccupied whether it is open (accessible) or closed (inaccessible), since the slidable barrier "blocks" rather than "plugs" the cavity. Hence, from the inner edge of the cavity 503, on up to the barrier, effectively constitutes a permanently-hallow portion of the cavity 504. Also in this kind of an embodiment, an optional shallow groove on the underside of the top edge of the cavity could help to hold the top of the barrier in place (when closed).

As automotive seating is a relatively mature field in the context of which the present invention is reasonably feasible without undue experimentation in light of the totality of this disclosure, existing seating design and production principles known in the art are reasonably adaptable to this invention to those of ordinary skill. The description herein is also sufficiently generalized to preserve flexibility for a range of vehicle types and/or configuration preferences. Standard engineering tools to facilitate incorporation of the features discussed herein could include a range of CAD applications employed in the field, including perhaps for example relevant industry-specific software packages such as Vistagy's Seat Design Environment™ Depending upon the number of different vehicle models and/or interior variants being accommodated by the present invention, such tools could aid in managing the various information useful for things such as trim engineering, virtual modeling or simulation, prototyping, and manufacturing purposes in the course of typical industrial implementations.

Notable advantages of the invention include, without limitation, helping to alleviate the physical constriction of babies and toddlers (especially those of high-percentile height, and/or those of a temperament less amenable to such constriction) riding in cars while strapped in to rear-facing carseats (especially for long durations). In turn, this helps to facilitate parental compliance with modern recommendations and regulations calling for maintaining a rear-facing carseat position until age 2 or beyond.

Advantages that one or more embodiments or aspects of the invention offer over some other solution approach(es) include, without limitation, the potential of being simpler and more versatile, being more compatible with common existing automotive interior and/or carseat designs, and being more cost-effective. In one aspect, it allows the main backrest to remain essentially in-place and otherwise unchanged rather than having to be folded-over. Another aspect avoids the need for a stabilizing rod, such as one used when the carseat is placed up away from the backrest (which also may consume more room ahead of it, forcing the seat in front of it further forward, as can also be the case with some carseat-oriented solutions). Another aspect helps avoid needing to raise the center of gravity, such as may occur with a higher carseat shell, or when employing a "folded-over" backrest. And of course, many of the present invention's embodiments, versions, etc. could be employed in combination with other solution approaches.

The present invention targets rear-facing passengers, who are typically children. Note that for forward-facing adults, whose automotive legroom concerns present fundamentally distinct problems and solutions, any cut-outs for enhancing legroom would need to be in the "back" of the "opposing" backrest, accommodating the knees but likely not the feet. But for rear-facers, by contrast, cut-outs or the like need to be in "front" the person's "own" backrest, accommodating the feet but likely not the knees. And of course, the present invention is compatible with use of a rear-faceable car-seat or the like. Moreover, many aspects or embodiments of the present invention also are conveniently amenable to restoring or resembling essentially "normal" structure on-demand for when the extra legroom is not desired, i.e., for functional and/or aesthetic purposes.

As pointed out, maintaining some bounds upon the scope of the legroom provides benefits over simply detaching the backrest or segment(s) thereof entirely—which, in addition, could be more cumbersome than the opening/closing options of the present invention, as well as lack or be less conducive to other functions and features feasible with its embodiments. Such benefits can include offering protection at the back and/or side(s) of the cavity, and, depending upon the cavity depth, precluding intrusion into space behind the backrest (and relatedly, precluding a need to even modify the backrest's rear surface at all). Merely providing a path through the backrest can render it more difficult to close or be made closeable and/or more difficult to provide a protective periphery and/or cavity backing, in addition to being less amenable to several closing means (see below). Embodiments involving "non-front seat" assemblies can exploit higher proportions of bulking material susceptible to the modifications associated with the present invention. (Note that the particular amount of legroom provided by a given embodiment depends upon the backrest used and the cavity's design configuration, and thus, while adding legroom, may not be enough for a given child to "fully" extend his legs.)

The noted aspect of being conducive to closing means restoring or simulating an un-deployed state (while the closable mechanism does not obstruct the cavity when needed), and in which lumbar support can be provided for a normal forward-facing passenger, presents one of the advantages that the closable/fillable embodiments enjoy over any "fortuitous" voids that may occur today (such as by the built-in carseats and movable armrests mentioned earlier), in addition to the key fact that, as noted, those are not configured for legroom purposes.

In this disclosure, depending upon the context, reference to additional "space," "legroom" or the like can contemplate either a deployed (i.e., unfilled, open, unblocked, etc.) state characterized by being available or ready for use, and/or potential space in an undeployed (i.e., filled, closed, blocked, etc.) state requiring some user action (i.e., removal of removable material, movement of a movable barrier, etc.) in order to render it fully or partially available. Also depending upon the context, reference to a "backrest" or "seat back" or the like can contemplate a movable/removable portion constituting part of the same—or else a distinct component that gets placed or positioned inside or upon it.

One of skill in the art will appreciate enumerable variations of the examples and principles disclosed herein, which are intended to be within the scope of the present invention, whether explicitly suggested herein or not—as reasonably understood in context. For example, certain qualities and features may potentially be optional and/or preferable, whether explicitly identified as such herein or not, whether expressed with conditionality or not, and nevertheless be neither necessary nor limiting. Conversely, that which is in fact essential is likewise ascertainable to those of ordinary skill. While explained and described collectively by all text and drawings herein, the invention is ultimately defined by the appended claims, which also constitute part of this specification; hence any explicit or implicit direct or indirect references to the invention or its characteristics should be understood in this spirit.

What is claimed is:

1. A vehicle seat assembly for increasing legroom available to a rear-facing passenger, comprising:
   a vehicle seat backrest; and
   a cavity in said backrest, said cavity being configured to provide limited additional legroom for a rear-facing passenger;
   wherein said cavity is essentially confined to said backrest's lumbar support area.

2. The vehicle seat assembly of claim 1, wherein said vehicle seat backrest is an automobile seat backrest that is not for a front row seat.

3. The vehicle seat assembly of claim 2, wherein said vehicle seat backrest does not comprise an integrated rear-faceable child carseat built into said backrest.

4. The vehicle seat assembly of claim 3, wherein said legroom is essentially no deeper than said backrest.

5. The vehicle seat assembly of claim 4, further comprising a removable or displaceable object which can be disposed to close said cavity when said legroom is not needed.

6. The vehicle seat assembly of claim 5, wherein said object becomes structurally integrated with said backrest when said cavity is closed by said object.

7. The vehicle seat assembly of claim 5, wherein said object contributes lumbar support for a forward-facing adult passenger when said cavity is closed by said object.

8. The vehicle seat assembly of claim 5, wherein said object remains attached to said backrest when said cavity is fully or partially open.

9. The vehicle seat assembly of claim 5, wherein said object is displaceable via repositioning within said backrest, thereby rendering said legroom accessible.

10. The vehicle seat assembly of claim 5, wherein said object comprises cushion material and/or surface material similar to said backrest.

11. A vehicle seat assembly for increasing legroom available to a rear-facing passenger, comprising:
    a vehicle seat backrest having a front surface and a back surface; and
    an opening in said front surface, said opening being located only approximately where said backrest would ordinarily provide lumbar support, whereby said opening facilitates a finite extension of space suitable for feet or legs of a rear-facing child in a safety seat, and whereby said backrest need not be removed or repositioned.

12. The vehicle seat assembly of claim 11, wherein said vehicle seat backrest is an automobile seat backrest that is not for a front row seat.

13. The vehicle seat assembly of claim 12, wherein said vehicle seat backrest does not comprise an integrated rear-faceable child carseat built into said backrest.

14. The vehicle seat assembly of claim 13, wherein said extension of space is essentially cabined between said front surface and said back surface, thereby providing a protective periphery within said backrest, and wherein said back surface need not be substantially modified to accommodate said opening.

15. The vehicle seat assembly of claim 14, further comprising a barrier disposable in a position rendering said extension of space fully or partially inaccessible, such that when disposed in said position said barrier provides an at least partial substitute for said lumbar support.

\* \* \* \* \*